Aug. 13, 1968     C. L. CRANDALL     3,397,364
INDUCTIVE LOOP METALLIC OBJECT DETECTOR
Filed May 24, 1967     2 Sheets-Sheet 1
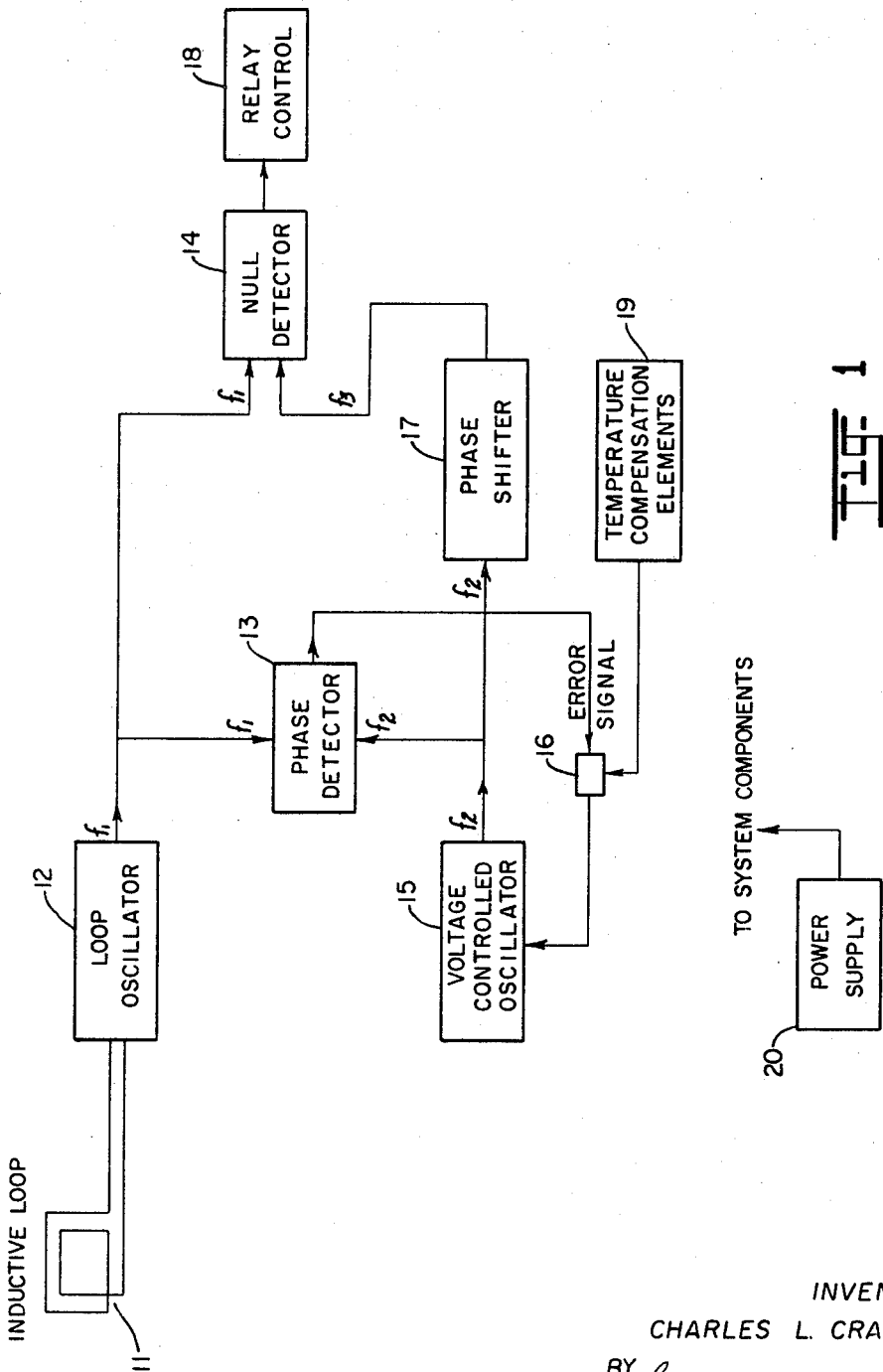
INVENTOR
CHARLES L. CRANDALL
BY
ATTORNEYS

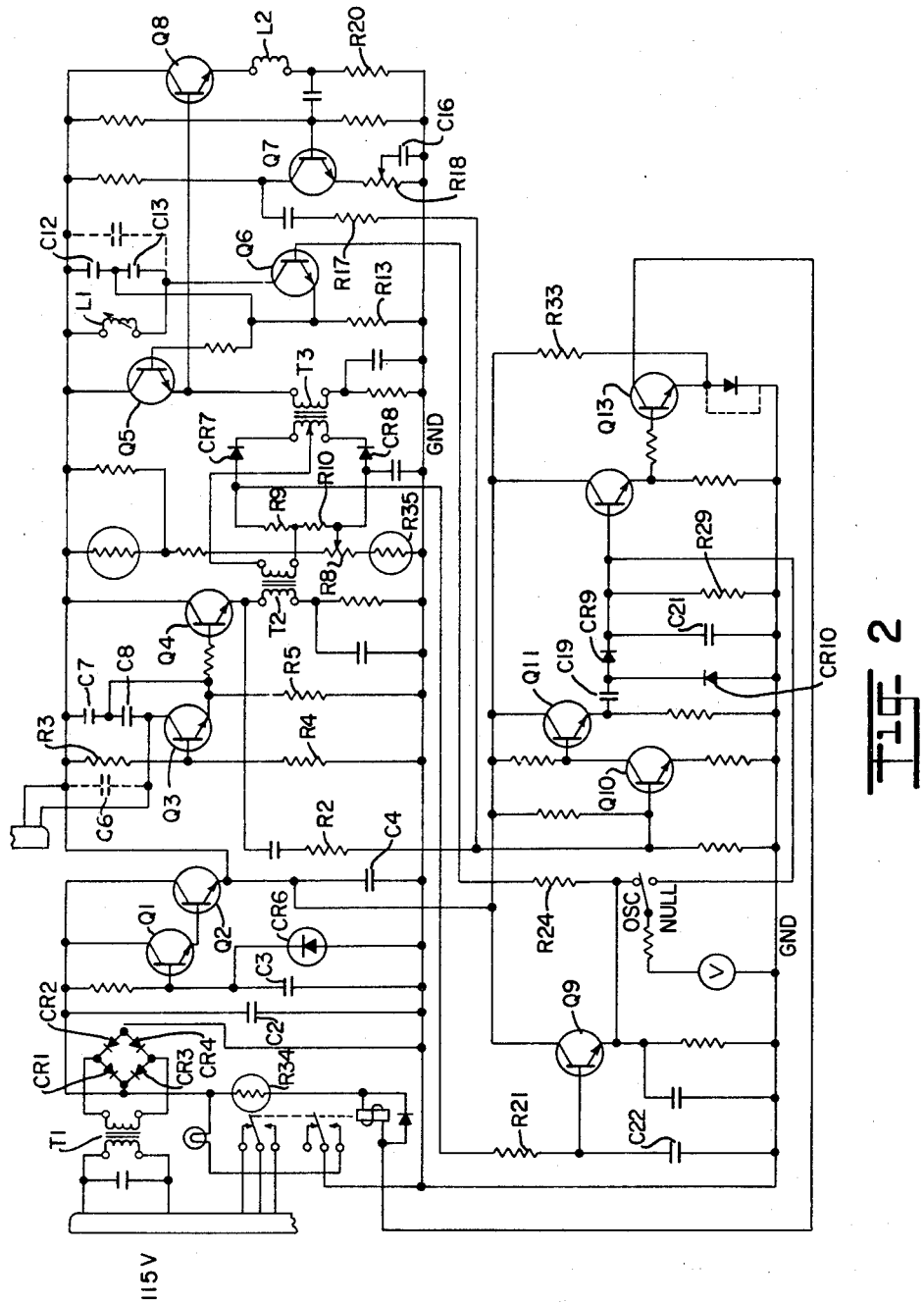

United States Patent Office 3,397,364
Patented Aug. 13, 1968

3,397,364
INDUCTIVE LOOP METALLIC
OBJECT DETECTOR
Charles L. Crandall, Fountain, Colo., assignor, by mesne assignments, to Small Business Administration, an agency of the United States Government
Filed May 24, 1967, Ser. No. 640,927
4 Claims. (Cl. 331—65)

ABSTRACT OF THE DISCLOSURE

A detector of metallic objects through change of inductance in an oscillator whereby the oscillator signal is compared with a signal from a second oscillator locked 90° out of phase, whose signal is further shifted with both the additionally shifted signal and the first oscillator signals now 180° out of phase being compared in a null detector which in turn operates a relay control.

---

The present invention relates to a system for detecting the presence of objects which change the induction of a loop and more particularly to a system comparing a first oscillator signal with a phase shifted second oscillator signal to detect this change in inductance.

With the system of the present invention the presence of objects may be readily made known. Such a system is suitable for monitoring or detecting the passage or presence of motor vehicles, railroad rolling stock or other objects containing metallic substances which can be made to affect the inductance of a loop located adjacent thereto.

Also in the present system, where an error signal is used, temperature compensation elements are introduced to reduce the effect of temperature in order to obtain more accurate results from the system.

Basically the present invention uses a system of detection with two oscillators locked-in to each other through a phase detector but emitting signals 90° out of phase with each other, with one of the signals further shifted another 90° out of phase and then compared in a null detector to the other oscillator signal which is varied by an inductive loop connection with objects present to affect said loop.

Further, it is an object to use the detection system to operate a relay dependent on the comparative results from counterbalancing the signals which are substantially 180° out of phase with each other in the null detector.

Objects and advantages which are inherent in the invention will become apparent from the following description, reference being had to the accompanying drawings wherein:

FIG. 1 is an overall block diagram of the presence detection system of the present invention; and FIG. 2 is a detail circuit diagram embodying the system of FIG. 1.

In FIG. 1 the presence detector system of the present invention is shown in block diagram form. In this figure inductive loop 11, which may consist of a few turns of insulated wire is employed as a transducer to obtain the intelligence desired, that is, to present a signal to the remainder of the detector system indicative of the presence or passage of a vehicle or other metallic object in the vicinity of the loop 11.

Inductive loop 11 forms the inductance for the tank circuit of an oscillator, in the case illustrated, for a conventional Colpitts type oscillator 12. The signal of frequency $f_1$ of oscillator 12 is established by the inductance of loop 11 and its associated tuning capacitors.

The output signal of frequency $f_1$ of loop oscillator 12 is coupled to separate circuits, one of which is phase sensitive detector 13 and the other null detector 14.

Another input signal of frequency $f_2$ to phase detector 13 is derived from voltage controlled oscillator 15. The output of phase detector 13 is a D-C voltage error signal which is fed back to oscillator 15 through connecting element 16 to cause the frequency of oscillator 15 to change such that its output signal of frequency $f_2$ will become locked to the output signal of frequency $f_1$ of loop oscillator 12. When signals of frequencies $f_1$ and $f_2$ are exactly the same, but 90° out of phase, the D-C output from phase detector 13 will be zero. This D-C output will become more positive or more negative, depending upon the phase angle deviation from 90° between signals of frequencies $f_1$ and $f_2$.

The signal having frequency $f_2$ from voltage controlled oscillator 15, which signal is 90° out of phase with the signal of frequency $f_1$ from loop oscillator 12, is coupled to a 90° phase shifter 17. The output signal of phase shifter 17 has a frequency $f_3$ which is nearly 180° out of phase with frequency $f_1$. The signals of frequencies $f_1$ and $f_3$ are combined in null detector 14, which essentially adds the two signals algebraically to obtain an output signal. If signals of frequencies $f_1$ and $f_3$ are exactly 180° out of phase and of equal magnitude, they will add algebraically to zero. If the phase is other than 180° or the amplitude is not equal, an output signal will result. This signal is detected in null detector 14 and employed to operate relay control 18. The relay contacts may be the ultimate output of the device.

Any change in the relative frequencies between signals of frequencies $f_1$ and $f_2$ will result in a change of the error signal from place detector 13. Although not shown here as used for detection purposes, the change in error signal could be used as an alternative method of detection.

If the change of frequency of the signal of frequencies $f_1$ relative to $f_2$ is due to the change in inductance of loop 11 caused by a vehicle or object in the field of loop 11, this will result in a shift in phase which will be sensed by null detector 14 and which is a desirable operation of the system of the present invention.

If a change of frequency is caused by a change of values of the various components used in the detection system due to the various temperature coefficients of these components, a phase shift between signals of frequencies $f_1$ and $f_3$ will be caused which is not desirable. To overcome these changes due to temperature, temperature compensation elements 19 are employed to correct the error signal at connecting element 16 so that oscillators 12 and 15 will remain frequency locked with a 90° phase difference between signals of frequencies $f_1$ and $f_2$ throughout the operating temperature range of the system.

A power supply 20 is connected to the system components to provide the necessary voltages and currents for operation. It could be commercial A-C power or from a suitable battery supply.

A detailed circuit which is illustrative of the system shown by block diagram in FIG. 1 is presented in FIG. 2.

Transformer T1, rectifiers CR1, CR2, CR3, CR4, capacitors C2, C3, C4, transistors Q1, Q2, and regulator diode CR6, comprise the components of a conventional series regulated power supply 20. With the present circuit the D-C output at the emitter of transistor Q2 is approximately 13.5 volts D-C.

The external connected loop of capacitors C7, C8 and resistors R3, R4 and R5 comprise the components of loop oscillator 12 with an output of a signal of frequency $f_1$. Capacitor C6 may be employed to adjust the frequency of oscillator 12 to a desirable value when it is used with loop 11 having a short lead-in. Transistor Q4 is connected as an emitter follower to provide drive to one input of phase detection transformer T2, and also an input to null detector 14.

Transformers T2, T3, resistors R9, R10, and diodes CR7 and CR8 comprise the components of a conventional product or phase sensitive detector 13 as is well known in the art.

The output of phase detector 13 is taken from the anode of diode CR7. This voltage will be zero volts with respect to the wiper of variable resistor R8 when the two input signals to primaries of transformers T2 and T3 are exactly 90° out of phase, but of the same frequency. A D-C voltage is superimposed on to the output through a voltage divider network consisting of resistors R34, R35, R33 and R8.

Thermistors R34 and R35 are employed for temperature compensation purposes as part of temperature compensation elements 19.

Voltage controlled oscillator 15 includes the components of transistor Q6, coil L1, capacitors C12, C13, and resistor R13.

Transistor Q5 is connected as an emitter follower and provides drive to another input of phase detector 13 through transformer T3 and also an input to transistor Q3 of phase shifter 17.

Initial bias voltage on the base of transistor Q6 is established by the position of the wiper of resistor R8, which will result in this D-C voltage being superimposed on the output of phase detector 13. The output of phase detector 13 is filtered by resistor R21 and capacitor C22. Transistor Q9 connected as an emitter follower provides a means of coupling this D-C level to the base of transistor Q6 through resistor R24. Oscillator 15 is adjusted by coil L1 to a frequency $f_1$. When this is achieved, transistor Q5 of oscillator 15 will become frequency locked to oscillator 12 with a 90° phase relation. Voltage control of the frequency of transistor Q5 of oscillator 15 is achieved by collector capacitance change due to the change of bias level on the base of transistor Q5.

The signal of frequency $f_2$ is also coupled to transistor Q8 and coil L2 of phase shifter 17. Coil L2 is highly inductive at the operating frequency. The voltage across resistor R20 will be nearly 90° out of phase with the emitter voltage of transistor Q8. This signal is amplified and inverted by transistor Q7. The amplitude is adjusted by controlling the degeneration in amplifier Q7 by means of by-pass condenser C16 and the wiper position of resistor R18. The output signal of frequency $f_3$ at the collector of transistor Q7 is 180° out of phase with the signal of frequency $f_1$ and of equal amplitude.

Signals of frequencies $f_1$ and $f_3$ are summed by resistors R2 and R17. The summing point provides the input signal to amplifier transistor Q10. Transistor Q11 is connected as an emitter follower and serves to isolate the loading effect of null detector 14, with its components of capacitors C19, C21, diodes CR9 and CR10 from transistor Q10.

The D-C output voltage across resistor R29 is the signal to relay control circuit 18.

In summary, when properly tuned, signal voltage at the summing point is nearly zero, because of the equal amplitude and 180° phase relation between the two signals of frequencies $f_1$ and $f_3$. If the phase of the signal of frequency $f_1$ changes due to the presence of a vehicle, an output will appear at the summing point of resistors R2 and R17. This output is amplified, detected, and used to activate transistor Q13 of relay control circuit 18.

It will be obvious to those skilled in the art that various changes may be made without departing from the scope of the invention and the invention is not to be considered limited to what is shown in the drawings and described in the specification.

What is claimed is:

1. A system to detect the presence of objects containing metallic substances comprising
   first and second oscillators, each having a signal output, said first oscillator including
      an inductive loop positioned to detect the presence of objects near said loop,
   phase detection means connected to said first and second oscillators and locking said signal outputs of said oscillators substantially 90° out of phase with each other,
   phase shifting means connected to said second oscillator to shift the phase of said signal output of said second oscillator an additional 90° out of phase with said signal output of said first oscillator,
   comparison means connected to said first oscillator and to said phase shifting means to detect said signal output from said first oscillator and the signal from said phase shifting means and add these signals algebraically,
   control circuit means connected to said comparison means operative by signals resulting from counterbalancing signals substantially 180° out of phase with each other in said comparison means.

2. The system of claim 1, further characterized by said second oscillator being a voltage controlled oscillator and receiving an error signal from said phase detection means.

3. The system of claim 2, further characterized by temperature compensation means to control said error signal in accordance with temperature changes in the system.

4. The system of claim 1, further characterized by said first oscillator being a Colpitts oscillator having said inductive loop as part of the tank circuit of said Colpitts oscillator.

References Cited

UNITED STATES PATENTS 3,222,664  12/1965  Premack _____ 331—65 X

ROY LAKE, *Primary Examiner.*

S. H. GRIMM, *Assistant Examiner.*